United States Patent Office 2,750,343
Patented June 12, 1956

2,750,343
PAINT BRUSH CLEANER
Adolph J. Beber, Copley, Ohio
No Drawing. Application April 12, 1952,
Serial No. 282,081
9 Claims. (Cl. 252—153)

This invention relates to a composition for and method of cleaning paint, lacquers, varnishes, and the like from hardened paint brushes. It particularly relates to a composition which will rapidly soften such paints and brushes and which is compatible with water so that the softened brushes may simply be washed in a detergent mixture and dried to obtain their original form.

Compositions heretofore proposed for cleaning paint brushes and removing paint from articles have generally consisted of a mixture of solvents such as chlorinated ethylene, carbon tetrachloride, esters, and the like. Finish removers have generally consisted of these materials plus a thickener such as bentonite, paraffin, and the like which forms a gel with a solvent which is the main effective agent. Such highly thickened materials containing bentonite and the like are not desirable for the cleaning of paint brushes and the like because of the difficulty of removing the thickener.

Many compositions have heretofore been proposed for the cleaning of paint brushes and, while such compositions are usually satisfactory when the paint in the brush has not been allowed to harden, when brushes have been allowed to stand in paint for long periods of time, it is the experience of applicant that none of the compositions available prior to the present invention permit the thorough cleaning of the brush. Even for the partial cleaning, the recommended procedure has been to form cuts between various segments of the bristles in order to permit greater access of solvent to the interior of the brush. After such effort, some of the paint still remains adhered in the sides of the bristles so that varying degrees of flexibility and a paint holding capacity that does not permit paint to flow smoothly is obtained.

It is an object of the present invention to provide a composition which is capable of cleaning paint brushes which have stood for years in lacquer, paint, varnish, or the like, and have hardened throughout, which composition softens and solubilizes the paint or varnish throughout the brush and conditions the brush so that it may be washed and soaked in water to provide a brush which looks and acts like a new brush.

It is another object of the present invention to provide a method of cleaning and rejuvenating old paint brushes which have been allowed to harden throughout with paint.

It is another object of the present invention to provide a non-corrosive composition which may also be used for removing finishes from coated articles.

Other objects will be apparent from the following description of the invention.

I have found, in accordance with the present invention, that paint brushes hardened for many years may be quickly cleaned by soaking them for relatively few hours in a composition comprising as essential ingredients (1) an aromatic solvent, a major portion of which preferably has a higher molecular weight than benzene, and (2) a water soluble aliphatic or cycloaliphatic amine which has connected to amino nitrogen aliphatic groups with a total molecular weight of at least 70, and not appreciably in excess of 150.

The amount of aromatic solvent present should be substantially greater than and preferably two or more times the volume of the total amount of amine present. The amine should be both water-soluble and soluble in aromatic hydrocarbons such as benzene, toluene, xylene, and should have a high pH. The amine serves as a hydrolyzing agent to rupture cross-linkages within various types of material as well as a solvent ingredient. If the amine is too alkaline, it may, of course, destroy certain types of bristles. If it is not sufficiently basic as is aniline, it fails to act as a hydrolyzing agent and acts only as a solvent. Volatility and water solubility are important factors. If it has insufficient molecular weight, it is too volatile so that there is high loss. If it has too high a molecular weight and has too many carbon atoms, then the water solubility is poor and cleansing of the brush in water is impeded. Of the various alkyl amines, cyclohexyl amine, hexyl amine, dibutyl amine, diamyl amine, and hydrocarbon amines with 5 to 9 or when water soluble even up to 10 carbon atoms may be used, and primary alkyl amines of 5 to 8 inclusive carbon atoms are preferred. In the case of primary alkyl amines, the insufficient water-solubility is had after 8 carbons, although in the case of secondary alkyl amines as many as 10 carbons may be present. Hydroxyl amines such as triethanol amine, diethanol amine, and morpholine may also be used as the amine for mixtures suitable for cleaning most types of brushes. However, the hydroxyalkylamines appear to have somewhat more rapid tendency to absorb $CO_2$ from the air and being somewhat more alkaline are detrimental to some of the synthetic bristles. It is therefore preferable that the amines consisting of hydrocarbon groups of 6 to 8 or even 10 carbon atoms total be used as the major hydrolyzing component and of these cyclohexyl amine is most desirable in its operation. Hydroxyalkyl amines above may however be used to obtain a portion of the benefits of the invention. Mixtures of aliphatic amines of different structure and different molecular weight may also be used.

The main constituent of the pain brush cleaners of the present invention is an aromatic solvent and solvent mixture comprising an aromatic solvent which preferably has a higher molecular weight than benzene. Molecular weight controls the rate of evaporation which is particularly important in the paint remover or paint brush cleaner because of the fact that paint brushes are usually allowed to soften in a container where the liquid is exposed to the atmosphere. I have found that the most desirable aromatic solvent for use in conjunction with cyclohexyl amine is xylene or commercial xylol. It has a relatively low volatility even when compared with benzene, and it has an exceedingly strong synergistic action with the cyclohexyl amine and the other amines having a molecular weight of 70 or above. The total aromatic liquid constituents of the composition should be 2 to 10 times the volume of the total amine constituents present. Although as little as 5% amine in the composition is effective in many instances when the cleaner is fresh, the amount of amine present should be at least 10% of the volume of the total of aromatic solvent and amine, and preferably should be 15 to 25% of the volume of the total of these ingredients, particularly to permit much reuse of the material. As much as 35% of the aliphatic amines may be present. As the amount of amine is increased above 25%, the extraction of carbon dioxide from the air becomes increasingly troublesome and the composition should not be used in an open container when it contains more than 35% total aliphatic amine component.

The aromatic solvents components in order to obtain rapid softening action should be at least 50% of the volume of the composition and should preferably be 60% to 80% of the composition. Water soluble alcohols such as ethyl alcohol and methyl alcohol may be incorporated in the composition along with the essential ingredients if desired to slightly improve the wiping-off of the composition when it is used as a paint remover. Similarly, some chlorinated solvents such as ethylene dichloride etc. as well as ester and ketone solvents such as acetone, ethyl acetate, butyl acetate may be present in addition to the aforementioned essential ingredients. These materials should if present preferably account for no more than about 25 or 30% by volume of the composition. Chlorinated solvents and ketones have a slight tendency to interact with amines and are not generally desired, however.

For cleaning of paint brushes, the composition should have water or gasoline or benzene type fluidity, i. e., it should be substantially devoid of thickeners such as bentonite, paraffin, starch and other gel-forming ingredients which are often used for paint removers. On the other hand, when a paint remover is desired, some gel-forming agent such as a bentone (bentonite treated with quaternary ammonium compound and preferably an organic silicon halide) paraffin, butyl cellulose, etc. may be incorporated.

The following examples in which parts are by volume illustrate the present invention:

*Example 1*

| | Parts |
|---|---|
| Commercial xylol | 80 |
| Cyclohexyl amine | 20 |

The above ingredients were simply mixed together to form the cleaning composition. Several paint brushes, some of which were previously used in lacqueur, and, some of which were previously used in shellac, all of which materials which had hardened in and around the paint brush for several months or years were immersed in the above composition which was present in sufficient amounts to cover the bristles of the brush and part of the ferrule. The brushes were allowed to remain immersed in an open container for 36 hours whereupon they were removed and found to be completely softened. The completely softened bristles were separately immersed in an aqueous solution of a synthetic detergent such as lauryl alcohol, sodium sulfate to remove the softened or solubilized reaction composition. Upon drying of the brushes, it was found that they had the appearance and feel of a new brush. The paint or varnish was completely removed from even the ferrule of the brush. No white residue was present on the bristles.

In the above example, all or part of the xylene may be substituted by benzene or toluene although xylene is preferably a major constituent because of low volatility and the remarkable synergistic action of xylene in the composition. Even an aliphatic hydrocarbon may be present for part of the xylene providing the aromatic constituents are maintained so as to be at least equal to and preferably twice the weight of the amines present and is also present in greater amounts than the weight of the aliphatic hydrocarbon solvent. The cyclohexyl amine may be substituted in whole or in part by any water soluble alkyl amines of 5 to 10 inclusive carbon atoms or even by morpholine or alkylanol amines of sufficient molecular weight if care is taken to maintain the brushes in a closed container during the soaking period. The liquid drained from the sludge of Example 1 may be re-used for other brushes.

*Example 2*

| | Parts |
|---|---|
| Cyclohexyl amine | 15 to 25 |
| Xylene | 60 |
| Alcohol | 25 to 15 |

The above ingredients are mixed as in Example 1 and brushes such as those in Example 1 are immersed therein. It is found that the results are substantially the same.

*Example 3*

| | Parts |
|---|---|
| A composition of Example 2 | 100 |
| Bentone (a bentonite clay treated with a quaternary ammonium halide believed to be cetyl trimethyl ammonium bromide and subsequently treated with dimethyl silicon dichloride, washed and dried) | 10 |

The above ingredients were mixed together to form a relatively thick slurry and brushed upon old painted surfaces. It is allowed to stand thereon about two hours, whereupon it is found that the paint may readily be scraped therefrom and any residue removed by washing with water.

In the above examples, the cyclohexyl amine may be substituted in whole or in part by any one or more of the amines previously mentioned.

In the claims, "free flowing" is intended to distinguish from "gel like" and is intended to describe a water-like or benzene-like flowability.

It is to be understood that in accordance with the provisions of the patent statutes, variations and modifications of the specific invention herein shown and described (for purposes of illustration) may be made without departing from the spirit of the invention.

What I claim is:

1. A paint brush cleaning composition the major portion of which consists of a free flowing mixture of an aromatic hydrocarbon solvent and a water soluble amine selected from the group consisting of cyclohexyl and aliphatic amines having aliphatic hydrocarbon groups connected to nitrogen of a total molecular weight of at least 70, and not substantially in excess of 150, said amine being 5 to 35 per cent of the volume of the mixture, and the aromatic solvent constituting the remainder of said mixture.

2. A composition according to claim 1 in which at least part of the amine is cyclohexyl amine and in which at least part of the aromatic solvent is xylene.

3. A composition suitable for cleaning paint brushes containing a hardened paint which consists essentially of a mixture of xylene and cyclohexyl amine, said cyclohexyl amine being 5 to 35 per cent by volume of said mixture.

4. A non-aqueous composition suitable for softening and removing paint comprising a mixture of an aromatic hydrocarbon solvent having a molecular weight higher than benzene and a water soluble aliphatic amine having connected to amine nitrogen at least one hydrocarbon organic group, the total of the molecular weights of the organic groups present in said amine being at least 70 and not substantially above 150, said amine being 15 per cent to 35 per cent by volume of said mixture, said aromatic solvent constituent being at least 50 per cent by volume of the total composition.

5. A composition according to claim 3 wherein the volume of cyclohexyl amine present is 15 to 25 per cent of the volume of said mixture.

6. A method of treating paint brushes which comprises immersing a paint brush in a non-aqueous composition consisting essentially of a mixture of a liquid aromatic hydrocarbon solvent and a water soluble aliphatic amine having connected to the amine nitrogen at least one hydrocarbon organic group and after softening, then washing the softened brush in an aqueous detergent mixture, said amine being characterized by having organic groups present in a total molecular weight of at least 70 and not substantially higher than 150, said amine being 15 per cent to 35 per cent by volume of said mixture.

7. A process according to claim 6 wherein said amine is cyclohexyl amine and where said aromatic solvent has a molecular weight higher than that of benzene.

8. A non-aqueous composition suitable for softening and removing paint, the liquid constituents of which consist essentially of a mixture of an aromatic hydrocarbon solvent having a methyl group attached to the nucleus thereof and a water soluble aliphatic amine having connected to amine nitrogen at least one hydrocarbon organic group, the molecular weight of an organic group of said amine being at least 70 and the total molecular weight of organic groups of said amine being not substantially above 150, said amine being 15 per cent to 35 per cent by volume of said mixture.

9. A non-aqueous composition suitable for softening and removing paint, the liquid constituent of which consists of a mixture of xylene and cyclohexyl amine, said cyclohexyl amine being 15 per cent to 35 per cent by volume of said liquid constituents.

References Cited in the file of this patent

UNITED STATES PATENTS

| | | |
|---|---|---|
| 1,529,168 | Cleveland | Mar. 10, 1925 |
| 1,829,583 | Davidson et al. | Oct. 27, 1931 |
| 2,176,995 | Hoffmann | Oct. 24, 1939 |
| 2,286,972 | Nash | June 16, 1942 |
| 2,433,517 | Kuentzel | Dec. 30, 1947 |
| 2,564,129 | Rotelli | Aug. 14, 1951 |